United States Patent [19]

Patterson et al.

[11] Patent Number: 4,610,370

[45] Date of Patent: Sep. 9, 1986

[54] PRESSURE RELEASE VENT

[75] Inventors: Gregory A. Patterson; Melvin S. Good, both of North Vancouver, Canada

[73] Assignee: Amoco Corporation, Chicago, Ill.

[21] Appl. No.: 814,686

[22] Filed: Dec. 30, 1985

[51] Int. Cl.$^4$ ............................................. F16K 17/40
[52] U.S. Cl. .................................. 220/207; 220/89 A; 222/397; 429/56; 429/82
[58] Field of Search ...................... 220/89 A, 207, 367; 222/397; 137/68.1; 429/56, 82

[56] References Cited

U.S. PATENT DOCUMENTS

| | | | |
|---|---|---|---|
| 3,724,727 | 4/1973 | Zundel | 222/397 |
| 3,826,412 | 7/1974 | Kneusel | 222/397 |
| 3,831,822 | 8/1974 | Zundel | 220/89 A X |
| 4,105,133 | 8/1978 | LaBarge | 220/367 X |
| 4,433,791 | 2/1984 | Mulawski | 222/397 X |
| 4,484,691 | 11/1984 | Lees | 137/68.1 X |
| 4,513,873 | 4/1985 | Klaschka | 220/207 X |

Primary Examiner—Steven M. Pollard
Attorney, Agent, or Firm—Richard A. Kretchmer; William T. McClain; William H. Magidson

[57] ABSTRACT

A pressure release vent for a container which comprises an indentation in a wall of the container which is interrupted by a scored hollow rib having an apex which connects the opposing sidewalls of the indentation at a distance above the bottom of the indentation which is equal to about 5% to about 75% of the depth of the indentation.

20 Claims, 8 Drawing Figures

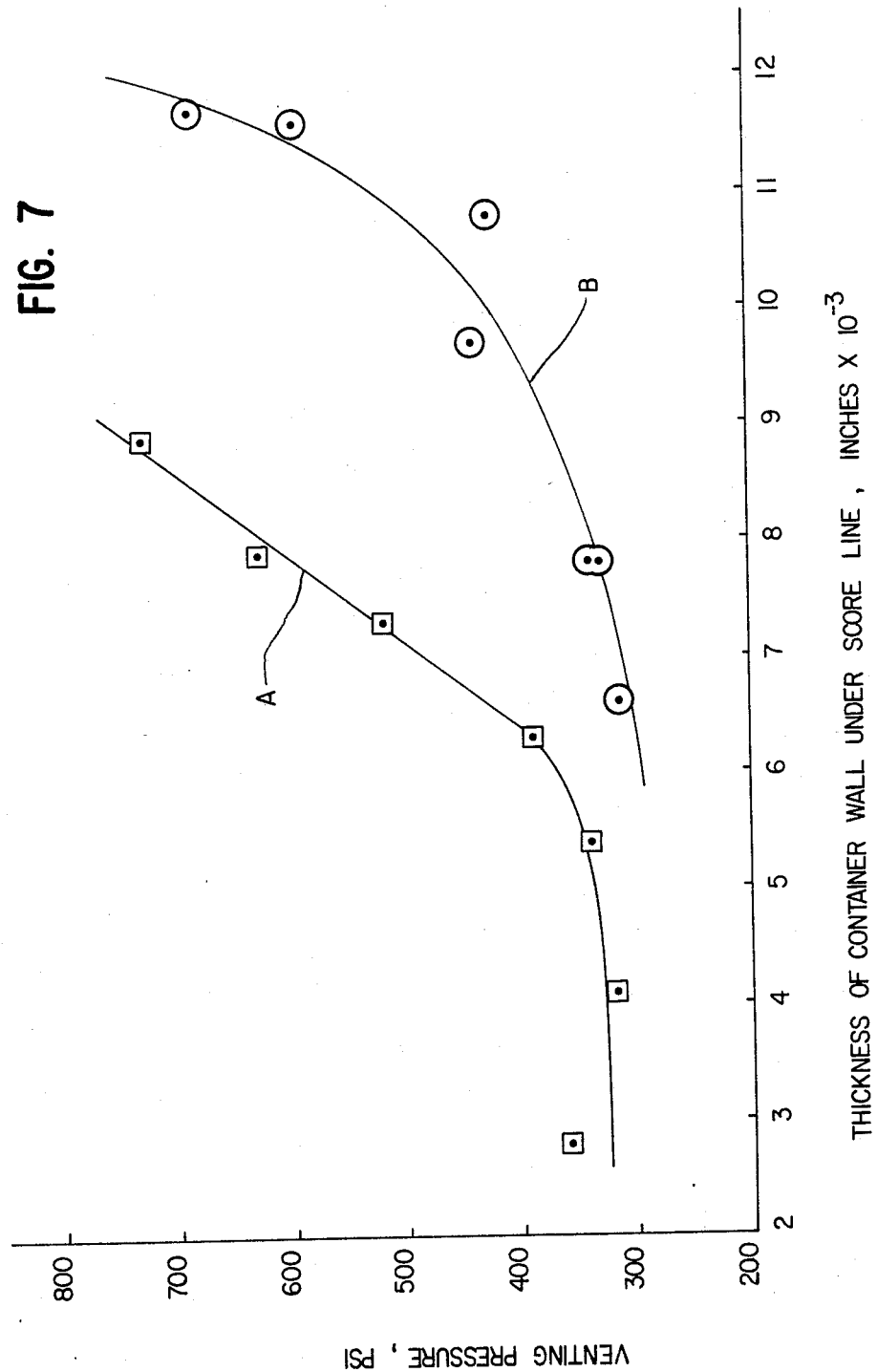

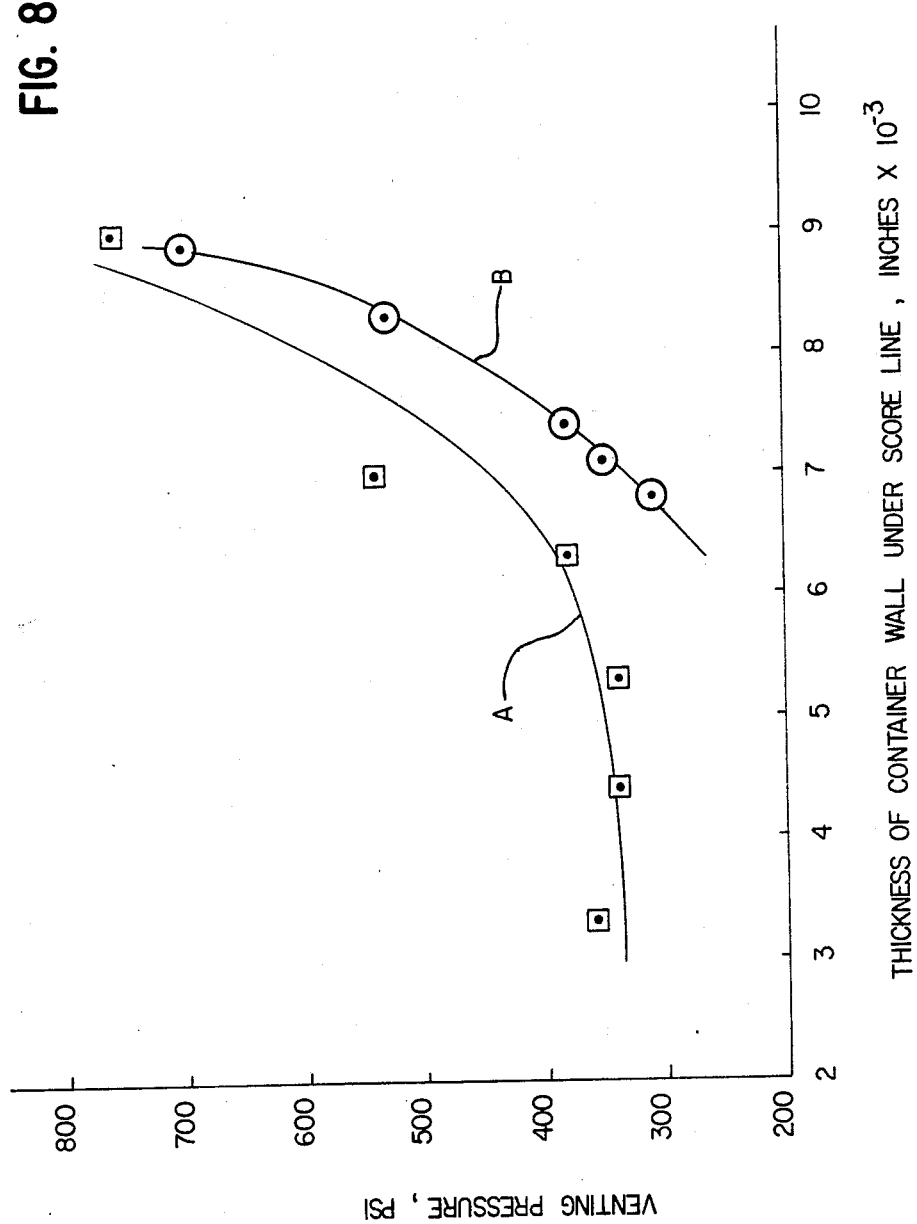

PRESSURE RELEASE VENT

BACKGROUND OF THE INVENTION

1. Field of the Invention

This invention relates to a pressure relief vent for a pressurized container.

2. Description of the Prior Art

Pressurized containers are widely used for a number of purposes which include, but are not limited to: (a) storage of gases such as oxygen, nitrogen, natural gas and propane; (b) packaging and dispensing consumer products such as paints, lacquers, varnishes, food products, hair spray, deodorants, shaving lather, insecticides and herbicides; and (c) packaging for electrochemical cells. The pressurized containers used for packaging and dispensing consumer products are typically aerosol containers which contain a product which is mixed with a propellant gas such as freon.

Pressurized containers are potentially dangerous because of the possibility that an explosion can result upon overpressurization. Such overpressurization can, of course, result when such a container is abused upon filling. More frequently, however, overpressurization results when the container and its contents are abused by exposure to elevated temperatures during incineration or by storage at unacceptably high temperatures. Overpressurization can also occur as the result of chemical reactions taking place within the container, such as in a sealed storage battery which releases gases internally upon overcharge or overdischarge. For example, lithium batteries are desirably enclosed in a casing which contains a pressure release vent to prevent any possibility of accidental explosion, and such batteries which utilize sulfur dioxide as an electrolyte component desirably have a vent that operates at about 350 psi.

One conventional method for incorporating a pressure release vent into a container involves the insertion of one or more score lines in a wall of the container in order to provide a point of weakness at which venting will take place upon overpressurization. For example, U.S. Pat. No. 3,292,826, issued to Abplanalp on Dec. 20, 1966, discloses a pressure relief vent which is formed by at least partially circumscribing a relatively large section of the container wall with a score line. Similarly, U.S. Pat. No. 4,256,812, issued to Tamura et al. on Mar. 17, 1981, discloses a pressure relief vent which consists of two score lines in the container wall which cross each other to form a cruciform incision.

U.S. Pat. No. 3,918,610, issued to Willis on Nov. 11, 1975, discloses a safety vent for a pressurized container which comprises: (a) an integral concavity in the container wall, (b) an integral hollow bridge interrupting said concavity, and (c) a weakening score line in the container wall transversely across the hollow bridge. Excessive pressure in the container acts to stress the bridge and results in a fracture of the residual container wall under the weakening score line. The approach set forth in this patent is not, however, entirely satisfactory. In a vent of this design, the wall thickness under the score line is a critical parameter if operation is to reliably take place at a predetermined pressure, and thickness tolerances for proper venting are undesirably small.

SUMMARY OF THE INVENTION

The present invention is directed to the discovery that a pressure release vent based on a score line in a container wall can be improved through the use of an indentation in the wall which is interrupted by at least one scored hollow rib having an apex which connects the opposing sidewalls of the indentation at a distance above the bottom of the indentation which is equal to about 5% to about 75% of the depth of the indentation. This structure serves to concentrate pressure-related stresses at the score line and, accordingly, permits larger tolerances for the wall thickness under the score line.

One embodiment of the invention is a pressure release vent for a container comprising a container wall having an indentation which is interrupted by at least one hollow rib with the apex of said rib connecting the opposing sidewalls of said indentation at a distance above the bottom of said indentation which is equal to about 5% to about 75% of the depth of said indentation and said hollow rib having a score line traversely across it, whereby excessive pressure in the container will tear the container wall at said score line and vent said container.

Another embodiment of the invention is a pressure relief vent for a container comprising a container wall having an annular hollow indentation projecting toward the interior of said container which is interrupted by: (a) a hollow bridge spanning the opposed sidewalls of the indentation; and (b) a hollow rib with the apex of said rib connecting the opposing sidewalls of said indentation at a distance above the bottom of said indentation which is equal to about 5% to about 75% of the depth of said indentation and said hollow rib having a score line traversely across it.

An object of this invention is to provide an improved pressure release vent for a pressurized container.

Another object of this invention is to provide a pressure release vent based on a score line in a container wall which will vent at a pressure which is relatively insensitive to the wall thickness under the score line.

Another object of this invention is to provide a pressure release vent which will reliably vent at a predetermined pressure.

A further object of this invention is to provide a pressure release vent which can be stamped into the wall of a container using conventional stamping techniques.

A still further object of this invention is to provide a pressure release vent which can be constructed from hard and/or strong materials such as stainless steel.

BRIEF DESCRIPTION OF THE DRAWINGS

FIG. 7 of the drawings illustrates venting pressure as a function of score line depth in a wall of 0.020-inch thick annealed mild steel for the pressure release vent of FIGS. 1 and 2 and the pressure release vent of FIGS. 5 and 6.

FIG. 8 of the drawings illustrates venting pressure as a function of score line depth in a wall of 0.011-inch thick nickel-plated mild steel for the pressure release vent of FIGS. 1 and 2 and a pressure release vent which is identical except that the scored hollow rib has been increased in size so that it bridges the annular indentation as in FIGS. 5 and 6.

DETAILED DESCRIPTION OF THE PREFERRED EMBODIMENTS

Figure 1:
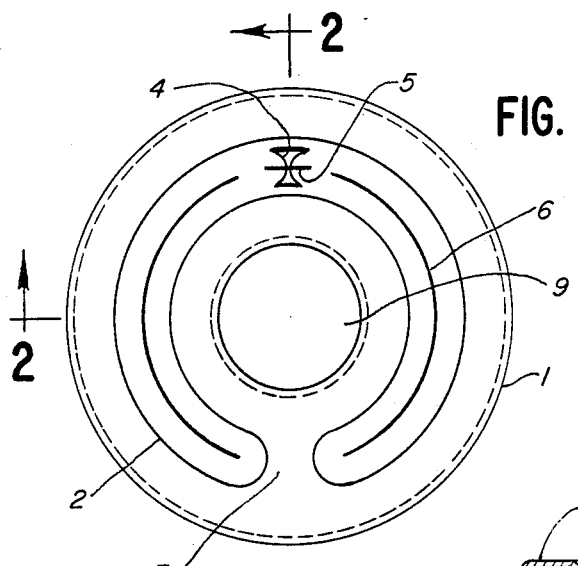
FIG. 1 of the drawings is a plan view of an embodiment of this invention.

While this invention is susceptible of embodiment in many different forms, there is shown in FIGS. 1-4 of the drawings two specific embodiments, with the understanding that the present disclosure is not intended to limit the invention to the embodiments illustrated.

FIGS. 1-4 illustrate the pressure release vent of this invention in a circular container wall. With reference to these figures, container wall 1 has an annular hollow indentation 2 formed therein which is interrupted by a hollow bridge 3 which spans the opposed sidewalls of annular indentation 2. In a preferred embodiment, the apex of bridge 3 is substantially in line with container wall 1 on both sides of annular indentation 2. The annular indentation 2 is preferably V-shaped in cross section with the angle formed by the intersecting walls of indentation 2 being in the range from about 40° to about 140°, preferably from about 60° to about 120°, and more preferably about 90°. It will be appreciated, however, that indentation 2 can assume other cross sectional shapes and, for example, can be U-shaped, semicircular or parabolic. It will also be appreciated that indentation 2 can project either toward the interior or the exterior of the container, although projection toward the interior is highly preferred.

The width and depth of annular indentation 2 are not narrowly critical. However, the depth is desirably from about 2 to 20 times the thickness of the container wall, and preferably from about 2 to about 10 times the wall thickness. The maximum width of annular indentation 2 is desirably from about 0.25 to about 4 times its depth, and preferably about equal to its depth. Although not required, annular indentation 2 preferably has a substantially uniform depth and width.

A hollow rib 4 which carries a score line 5 transversely across it also interrupts annular indentation 2. The score line is preferably centered on rib 4 and located approximately tangent to the circle which is defined by the center 6 of indentation 2. As score line 5 is moved from this preferred tangent position and toward either of the walls of indentation 2, the venting pressure of the pressure release vent becomes more sensitive to the depth of score line 5. Although not essential, it is frequently more convenient to form the score line in the exterior surface of the container wall rather than the interior surface. Although the thickness of the residual container wall under the score line will be determined by the desired venting pressure, this thickness is preferably at least about one-fourth of the original wall thickness.

The apex of hollow rib 4 connects the opposing sidewalls 7 and 8 of annular indentation 2 at a position above the bottom of indentation 2 which is equal to about 5% to about 75%, preferably about 40% to about 60%, and more preferably about 50% of the depth of indentation 2. The centerline of rib 4 desirably lies approximately on a radial line of the circle which is defined by annular indentation 2. Hollow rib 4 is preferably approximately V-shaped in cross section. However, it will be appreciated that rib 4 can assume other cross sectional shapes and, for example, can be U-shaped, semicircular or parabolic.

Hollow bridge 3 and hollow rib 4 are desirably located at an angle in the range from about 130° to about 230° with respect to each other based on the circle which is defined by annular indentation 2. Preferably, however, this angle is about 180° since this orientation permits an efficient functioning of the vent by an outward buckling of the vent at rib 4 while bridge 3 acts as a hinge for this buckling motion. As a consequence of its design, the pressure release vent of this invention focuses a pressure-induced outward buckling motion of the vent at rib 4 and operates as a consequence of the resulting shearing action at score line 5. Although the hollow bridge 3 in FIGS. 1 and 3 is not an essential element of this invention, the use of such a bridge represents a highly preferred embodiment of the invention.

Hollow rib 4 desirably has a width which subtends an arc in the range from about 5° to about 20°, and preferably from about 7° to about 15° based on the circle which is defined by annular indentation 2. Hollow bridge 3 desirably has a width which subtends an arc in the range from about 5° to about 45°, and preferably from about 20° to about 45° based on the circle which is defined by annular indentation 2.

Circular depression 9, which is circumscribed by annular indentation 2, is not necessary for the functioning of the pressure release vent of this invention. However, it is believed that depression 9 serves to impart increased rigidity to this portion of the vent and, accordingly, serves to improve the performance of the vent. If desired, depression 9 can be utilized as a point of entry into the container for valves, tubing, electrodes and the like. A circular depression of the type illustrated by depression 9 can, for example, have a depth which is approximately equal to that of the annular indentation and a diameter which is equal to about one-fifth to about five-eighths that of the circle which is defined by the annular indentation.

Figure 2:
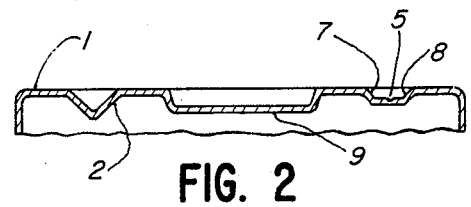
FIG. 2 of the drawings is a sectioned view of FIG. 1 taken along line 2—2.
Figure 3:
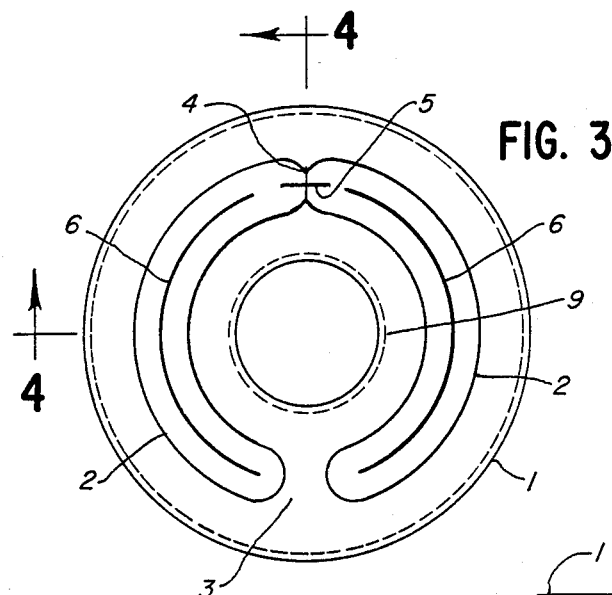
FIG. 3 of the drawings is a plan view of another embodiment of this invention wherein the shape of the scored hollow rib has been modified from that of FIG. 1 for even greater concentration of pressure-induced stress at the score line.
Figure 4:
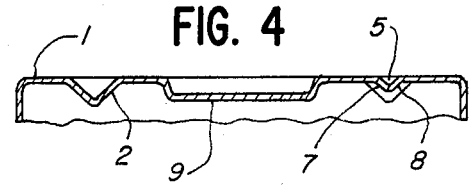
FIG. 4 of the drawings is a sectioned view of FIG. 3 taken along line 4—4.

FIGS. 1 and 2 illustrate one embodiment of the invention while FIGS. 3 and 4 illustrate another embodiment. These two embodiments are identical except for the shape and size of scored rib 4. The shape of rib 4 in FIGS. 3 and 4 results in the concentration of more pressure-induced stress at score line 5 than in the embodiment which is set forth in FIGS. 1 and 2. As a result, the depth of score line 5 in the embodiment of FIGS. 3 and 4 is not as critical as in the embodiment of FIGS. 1 and 2. For example, the embodiment of FIGS. 1 and 2 is highly satisfactory for use as a vent for $C_s$ size battery casing (having an outside diameter of 0.861 inch) which is constructed of 0.011 inch thick mild steel and designed to vent at 350±25 psi. However, the embodiment of FIGS. 1 and 2 is less satisfactory for a $C_s$ size stainless steel battery casing (designed to vent at 350±25 psi) because a reliable venting pressure requires a tolerance for the depth of score line 5 which is too small for typical production equipment. In contrast, the embodiment of FIGS. 3 and 4 is highly satisfactory for a stainless steel $C_s$ size battery casing (designed to vent at 350±25 psi) because the modified shape of rib 4 results in a greater concentration of stress at score line 5 and thereby increases the allowable tolerance for the depth of score line 5.

Figure 5:
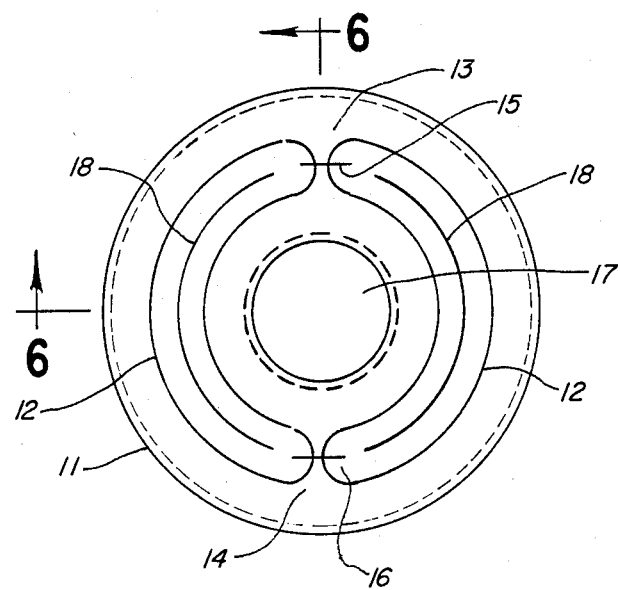
FIG. 5 of the drawings is a plan view of a conventional pressure release vent of the type set forth in U.S. Pat. No. 3,918,610.
Figure 6:
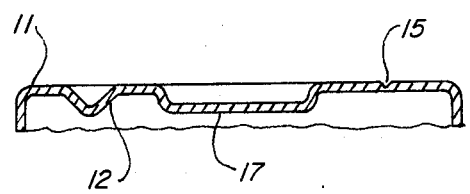
FIG. 6 of the drawings is a sectioned view of FIG. 5 taken along line 6—6.

FIGS. 5 and 6 illustrate a pressure release vent of the type disclosed in U.S. Pat. No. 3,918,610 which is incorporated in a circular container wall. With reference to these figures, container wall 11 has an annular hollow indentation 12 formed therein which is interrupted by two hollow ribs 13 and 14, each of which carries a score line 15 and 16 transversely across it. The hollow ribs 13 and 14 completely span the opposed sidewalls of annular indentation 12. A circular depression 17 is circumscribed by annular indentation 12. Unlike the pressure release vent of this invention, the prior art vent of FIGS. 5 and 6 has scored ribs which completely bridge the opposed sidewalls of the annular indentation which they interrupt.

EXAMPLE I

A series of seven size C battery casings (having an outside diameter of 0.997 inch) were constructed which contained the pressure release vent of FIGS. 1 and 2 incorporated into the circular bottom of the casing. Except for the depth of score line 5, the members of this series were identical, being fabricated from 0.020-inch thick mild steel, wherein the circle defined by the center 6 of annular indentation 2 had a diameter of 0.700 inch, indentation 2 had a depth of 0.060 inch, and the walls of indentation 2 formed an angle of 90°. The thickness of the container wall under score line 5 was varied in the series over the range from 0.0028 inch to 0.0089 inch. Prior to testing, each casing was annealed by heating at a temperature of about 980° C. in an argon atmosphere. The venting pressure of each member of this series of battery casings was then determined by slowly pressurizing each casing with nitrogen and recording the pressure at which the pressure release vent permitted venting to occur. The results are set forth as Curve A in FIG. 7.

A series of seven size C battery casings (having an outside diameter of 0.997 inch) were constructed which contained the prior art pressure release vent of FIGS. 5 and 6 incorporated into the circular bottom of the casing. Except for the depth of score lines 15 and 16, the members of this series were identical, being fabricated from 0.020-inch thick mild steel, wherein the circle defined by the center 18 of annular indentation 12 had a diameter of 0.700 inch, indentation 2 had a depth of 0.060 inch, and the walls of indentation 2 formed an angle of 90°. The thickness of the container wall under score lines 15 and 16 was varied in the series over the range from 0.0066 to 0.0117 inch. Prior to testing, each casing was annealed by heating at a temperature of about 980° C. in an argon atmosphere. The venting pressure of each member of this series of battery casings was then determined in the manner described above, and the results are set forth as Curve B in FIG. 7.

A desirable casing for a lithium-sulfur dioxide battery should have the ability to vent at a pressure of 350±25 psi. FIG. 7 also demonstrates that the pressure release vent of this invention (the embodiment of FIGS. 1 and 2) permitted venting at 350±25 psi over a range of wall thickness under score line 5 of from 0.0028 to 0.0060 inch (0.0044±0.0016 inch). In contrast, FIG. 7 also demonstrates that the prior art vent of FIGS. 5 and 5 permitted venting at a pressure of 350±25 psi over a range of wall thickness under score lines 15 and 16 of from 0.0076 to 0.0090 inch (0.0083±0.0007 inch). Accordingly, the pressure release vent of this invention permits a tolerance for the wall thickness under score line 5 (±0.0016 inch) which is more than twice as large as the allowable tolerance (±0.0007 inch) for the wall thickness under the score lines 15 and 16 of the prior art vent.

EXAMPLE II

A series of six size $C_s$ battery casings (having an outside diameter of 0.861 inch) were constructed which contained the pressure release vent of FIGS. 1 and 2 incorporated into the circular bottom of the casing. Except for the depth of score line 5, the members of this series were identical, being fabricated from 0.011-inch thick nickel-plated mild steel, wherein the circle defined by the center 6 of annular indentation 2 had a diameter of 0.600 inch, indentation 2 had a depth of 0.050 inch, the apex of rib 4 was 0.030 inch above the bottom of indentation 2, and the walls of indentation 2 formed an angle of 90°. The thickness of the container wall under score line 5 was varied in the series over the range from 0.003 inch to 0.0090 inch. The venting pressure of each member of this series of battery casing was then determined by slowly pressurizing each casing with nitrogen and recording the pressure at which the pressure release vent permitted venting to occur. The results are set forth as Curve A in FIG. 8.

A series of five size $C_s$ battery casings (having an outside diameter of 0.861 inch) were constructed which contained a pressure release vent incorporated into the circular bottom of the casing. The pressure release vent was identical with that of FIGS. 1 and 2 except that the rib 4 completely spanned the opposed sidewalls of annular indentation 2. Except for the depth of score line 5 across rib 4, the members of this series were identical, being fabricated from 0.011-inch thick nickel-plated mild steel, wherein the circle defined by the center of the annular indentation had a diameter of 0.600 inch, the annular indentation had a depth of 0.050 inch, the apex of the scored rib was 0.050 inch above the bottom of the annular indentation (the rib completely bridged the annular indentation), and the walls of the annular indentation formed an angle of 90°. The thickness of the container wall under the score line was varied in the series over the range from 0.0068 inch to 0.0089 inch. The venting pressure of each member of this series of battery casings was then determined in the manner described above, and the results are set forth as Curve B in FIG. 8.

As stated in Example I, a desirable casing for a lithium-sulfur dioxide battery should have the ability to vent at a pressure of 350±25 psi. FIG. 8 demonstrates that the pressure release vent of this invention (the embodiment of FIGS. 1 and 2) permitted venting at 350±25 psi over a range of wall thickness under score line 5 of from 0.0033 to 0.0060 inch (0.0046±0.0013 inch). In contrast, FIG. 8 also demonstrates that a vent which is identical, except for the fact that the scored rib completely bridges the annular indentation, permitted venting at a pressure of 350±25 psi over a range of wall thickness under the score line of from 0.0069 to 0.0074 inch (0.0071±0.0003 inch). Accordingly, the pressure release vent of this invention permits a tolerance for the wall thickness under score line 5 (±0.0013 inch) which is more that four times larger than the allowable tolerance (±0.0003 inch) for this parameter in a vent which is identical except for the fact that the scored rib completely bridges the annular indentation. These results demonstrate the critical character of the position at which the apex of the scored rib connects the opposing sidewalls of the annular indentation.

We claim:

1. A pressure release vent for a container comprising a container wall having an indentation which is interrupted by at least one hollow rib with the apex of said rib connecting the opposing sidewalls of said indentation at a distance above the bottom of said indentation which is equal to about 5% to about 75% of the depth of said indentation and said hollow rib having a score line traversely across it, whereby excessive pressure in the container will tear the container wall at said score line and vent said container.

2. A pressure release vent as set forth in claim 1 wherein said indentation is substantially annular in shape.

3. A pressure release vent as set forth in claim 1 wherein said hollow rib has a substantially V-shaped cross section.

4. A pressure release vent for a container comprising a container wall having an annular hollow indentation projecting toward the interior of said container which is interrupted by:

(a) a hollow bridge spanning the opposed sidewalls of the indentation; and (b) a hollow rib with the apex of said rib connecting the opposing sidewalls of said indentation at a distance above the bottom of said indentation which is equal to about 5% to about 75% of the depth of said indentation and said hollow rib having a score line traversely across it.

5. A pressure release vent as set forth in claim 4 wherein the cross section of said annular indentation is approximately V-shaped.

6. A pressure release vent as set forth in claim 4 wherein the depth of said annular indentation is from about 2 to about 10 times the thickness of the container wall.

7. A pressure release vent as set forth in claim 4 wherein the depth of said annular indentation is approximately equal to its maximum width.

8. A pressure release vent as set forth in claim 4 wherein said bridge is located at an angle of about 180° with respect to said rib based on the circle which is defined by said annular indentation.

9. A pressure release vent as set forth in claim 4 wherein said bridge has a width which subtends an arc in the range from about 20° to about 45° based on the circle which is defined by said annular indentation.

10. A pressure release vent as set forth in claim 4 where the apex of said bridge is substantially in line with the container wall on both sides of said annular indentation.

11. A pressure release vent as set forth in claim 4 where the centerline of said rib lies approximately on a radial line of the circle which is defined by said annular indentation.

12. A pressure release vent as set forth in claim 4 wherein the cross section of said hollow rib is approximately V-shaped.

13. A pressure release vent as set forth in claim 4 wherein said hollow rib has a width which subtends an arc in the range from about 7° to about 15° based on the circle which is defined by said annular indentation.

14. A pressure release vent as set forth in claim 4 wherein the apex of said hollow rib connects the opposing sidewalls of said indentation at a distance above the bottom of said indentation which is equal to about 40% to about 60% of the depth of said indentation.

15. A pressure release vent as set forth in claim 4 wherein said score line is approximately tangent to the circle which is defined by the center of said annular indentation.

16. A pressure release vent as set forth in claim 4 wherein said score line is formed in the exterior surface of said container wall.

17. A pressure release vent as set forth in claim 4 wherein the residual container wall under said score line is at least about one-fourth the original wall thickness.

18. A pressure release vent as set forth in claim 4 wherein said annular indentation circumscribes a circular depression projecting toward the interior of the container.

19. A pressure release vent as set forth in claim 18 wherein said circular depression has a diameter which is equal to about one-fifth to about five-eighths that of the circle which is defined by said annular indentation.

20. A pressure release vent as set forth in claim 4 wherein said container is for a lithium battery which comprises sulfur dioxide as an electrolyte component.

* * * * *